(12) United States Patent
Carignan et al.

(10) Patent No.: US 8,709,628 B2
(45) Date of Patent: Apr. 29, 2014

(54) BATTERY PACK WITH CONNECTING DEVICE

(75) Inventors: Claude Carignan, Varennes (CA); Pierre LeVerone, Blainville (CA); Alain Vallee, Varennes (CA); Stephane Carignan, Longueuil (CA); Denis Pomerleau, St-Constant (CA)

(73) Assignee: Bathium Canada Inc., Boucherville (CA)

( * ) Notice: Subject to any disclaimer, the term of this patent is extended or adjusted under 35 U.S.C. 154(b) by 66 days.

(21) Appl. No.: 12/874,798

(22) Filed: Sep. 2, 2010

(65) Prior Publication Data

US 2012/0058382 A1    Mar. 8, 2012

(51) Int. Cl.
*H01M 2/24* (2006.01)

(52) U.S. Cl.
USPC ............................................. 429/65; 429/158

(58) Field of Classification Search
USPC ......... 429/158, 53, 61, 65; 411/302; 385/109; 16/344; 337/157, 159
See application file for complete search history.

(56) References Cited

U.S. PATENT DOCUMENTS

| | | | | |
|---|---|---|---|---|
| 5,804,770 | A * | 9/1998 | Tanaka ....................... | 174/138 F |
| 6,071,052 | A * | 6/2000 | Kerr ............................. | 411/302 |
| 2003/0047366 | A1* | 3/2003 | Andrew et al. .............. | 180/68.5 |
| 2005/0083164 | A1* | 4/2005 | Caruso et al. ................. | 337/157 |
| 2010/0310905 | A1* | 12/2010 | Oriet et al. ........................ | 429/1 |

* cited by examiner

*Primary Examiner* — Mark F Huff
*Assistant Examiner* — Monique Wills
(74) *Attorney, Agent, or Firm* — McMillan LLP

(57) ABSTRACT

A battery pack for an electric or hybrid vehicle having battery connectors for connecting batteries in series and a battery connector are disclosed that reduces the risks of potential electric shocks during assembly, servicing and in emergency situation. The battery connector includes an interrupter having disconnect capabilities in the event of the vehicle being involved in a collision.

8 Claims, 5 Drawing Sheets

BATTERY PACK WITH CONNECTING DEVICE

FIELD OF THE INVENTION

The present invention relates to a battery pack for electric or hybrid vehicles and more specifically to a battery pack having a device for connecting high voltage batteries of a battery pack.

BACKGROUND OF THE INVENTION

Battery packs for electric vehicle include multiple high voltage batteries typically connected in series via high gauge wire connecting the positive and negative poles of the batteries. The total voltage of a battery pack in an electric vehicle can reach up to 400 volts when all batteries are connected together.

A battery pack is typically assembled manually by technicians connecting all the batteries together in series with high gauge wires. The total voltage of the battery pack increases with each new battery being connected. As the total voltage of the battery pack increases, the risk of electric shocks for the technicians connecting the batteries together also increases since they are essentially in contact with the battery poles through the tools they use and the manipulation of the high gauge wires. Care must be used when connecting the poles of the batteries to avoid direct contact with the power source since at these high voltages, high currents may circulate which may temporarily incapacitate the technician who may be unable to quickly disengage himself from the direct contact. For this reason, it has become standard practice in the industry to have a second technician monitoring the assembly of a battery pack ready to intervene in case of direct contact with the battery poles.

For the same reasons, care must be used by the competent technician when servicing a battery pack and even more so for the non-initiated who improvises himself as a technician unaware of the risks. High voltage battery packs are preferably sealed to avoid any manipulation of the batteries by untrained labour.

Furthermore, high voltage battery packs in an electric vehicle may become hazardous when the vehicle is involved in an accident. In some circumstances, the battery pack of the vehicle may be damaged or become exposed or may short-circuit with the vehicle frame or other components of the vehicle thereby exposing occupants as well as emergency crews to potential electric shocks.

Therefore, there is a need for a device for connecting high voltage batteries of a battery pack for an electric vehicle that reduces the risks of potential electric shocks during assembly, servicing and in emergency situation.

SUMMARY OF THE INVENTION

It is an object of the present invention to ameliorate at least some of the inconveniences present in the prior art.

It is also an object of the present invention to provide a battery pack having connecting devices for connecting high voltage batteries that reduces or eliminates the risks of potential electric shocks during assembly and servicing of the high voltage battery pack.

It is another object of the present invention to provide a battery pack having connecting devices for connecting high voltage batteries adapted to disconnect the high voltage batteries in case of emergency.

In one aspect, the invention provides a battery pack for electric or hybrid vehicle having multiple batteries connected in series by battery connectors, each battery having a positive and a negative pole; each battery connector comprising: a pair of battery pole covers made of an electrically insulating material mounted onto battery poles of two adjacent batteries, each battery pole cover having a receptacle area and an aperture providing access to the battery poles; a connect-disconnect safety device having a conductive element made of an electrically conductive material inserted into the receptacle area of the pole covers for electrically connecting the two adjacent batteries, and an interrupter, a central portion of the conductive element passing through the interrupter, the interrupter including a pyrotechnic charge and a mechanical cutter adapted to cut the central portion of the conductive element in the event of the vehicle being involved in a collision, thereby disconnecting the series connection of the batteries and a pair of fasteners for securing the conductive element to the poles of the two adjacent batteries.

In one aspect of the invention the interrupter includes a housing made of an electrically insulating reinforced plastic material.

In another aspect of the invention, the mechanical cutter includes a wedge aligned with the central portion of the conductive component which is actuated by the pyrotechnic charge that cuts the central portion of the conductive element permanently in the event of a collision. Advantageously, the interrupter includes an igniter that set off the pyrotechnic charge triggered by an electrical signal received from an electronic control unit (ECU) of the vehicle sensing a collision.

In a further aspect of the invention, each fastener of the pair of fastener is positioned inside one of the battery pole covers, each fastener including a threaded portion made of metal and an electrically insulated portion made of a non-conductive material, the electrically insulated portion of the fasteners being accessible through the apertures of the battery pole covers for fastening the fasteners onto the battery poles.

In yet another aspect of the invention, each battery pole cover includes a first portion adapted for mounting onto the battery pole and a second portion assembled onto the first portion to define the receptacle area, the second portion having the aperture for accessing the fastener.

In a further aspect, the invention provides a battery connector for connecting a plurality of batteries in series to form a battery pack, the battery connector comprising: a pair of battery pole covers made of an electrically insulating material for mounting onto battery poles of two adjacent batteries, each battery pole cover having a receptacle area for providing access to the battery poles and an aperture; a connect-disconnect safety device having a conductive element made of an electrically conductive material inserted into the receptacle area of the pole covers for electrically connecting the two adjacent batteries, and an interrupter, a central portion of the conductive element passing through the interrupter, the interrupter including a pyrotechnic charge and a mechanical cutter adapted to cut the central portion of the conductive element in the event of the vehicle being involved in a collision, thereby disconnecting the series connection of the batteries; and a pair of fasteners for securing the connecting bridge to the poles of the two adjacent batteries, each fastener positioned inside one of the pair of battery pole covers, each fastener including a threaded portion made of metal and an electrically insulated portion made of a non-conductive material, the electrically insulated portion of the fasteners being accessible through the apertures of the battery pole covers.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
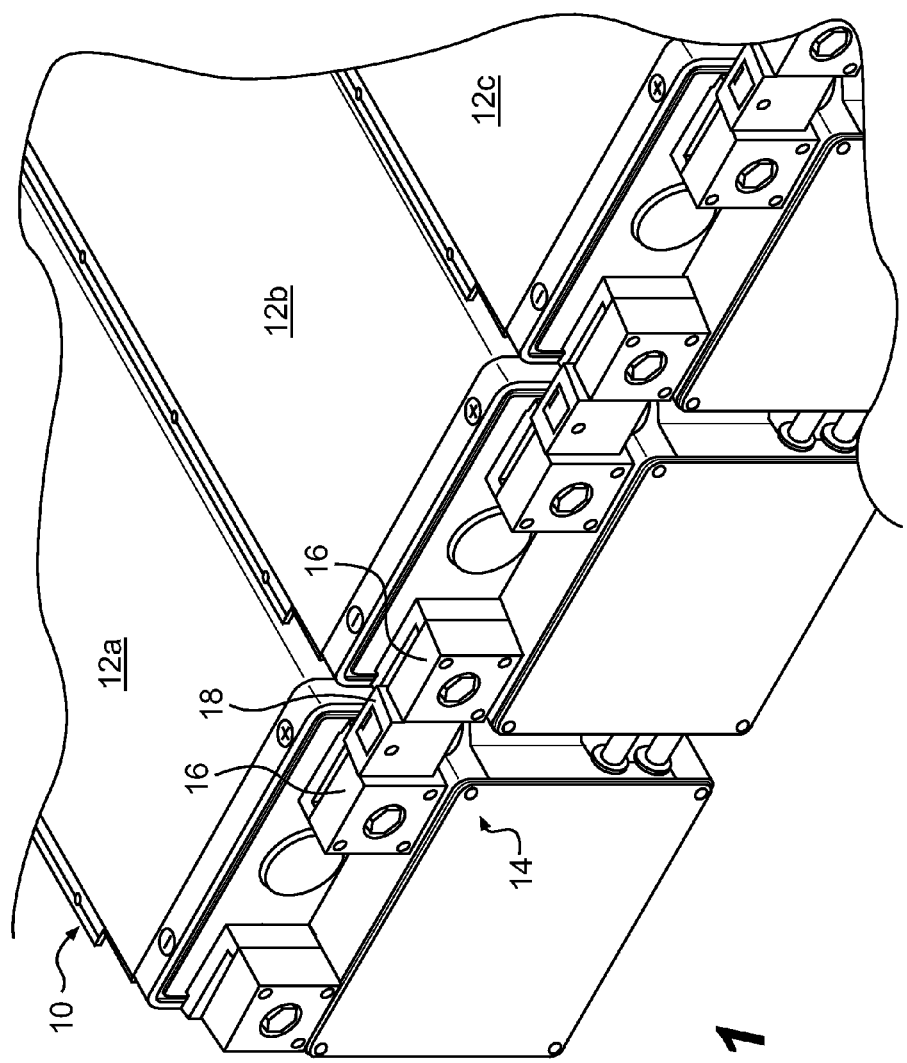
FIG. 1 is a downward front perspective view of a portion of an automotive battery pack connected in series with battery connectors in accordance with an embodiment of the invention.

With reference to FIG. 1, there is shown a portion of an automotive battery pack 10 including a plurality of batteries 12a, 12b, 12c . . . connected in series via battery connectors 14. In FIG. 1, the positive pole of battery 12a is connected to the negative pole of battery 12b, and the positive pole of battery 12b is connected to the negative pole of battery 12c. Each battery connectors 14 includes battery pole covers 16 made of an electrically insulating plastic, a connect-disconnect safety device 18 and a pair of fasteners 20 adapted to connect the extremities of the connect-disconnect safety device 18 to the positive and negative poles of adjacent batteries.

Figure 2:
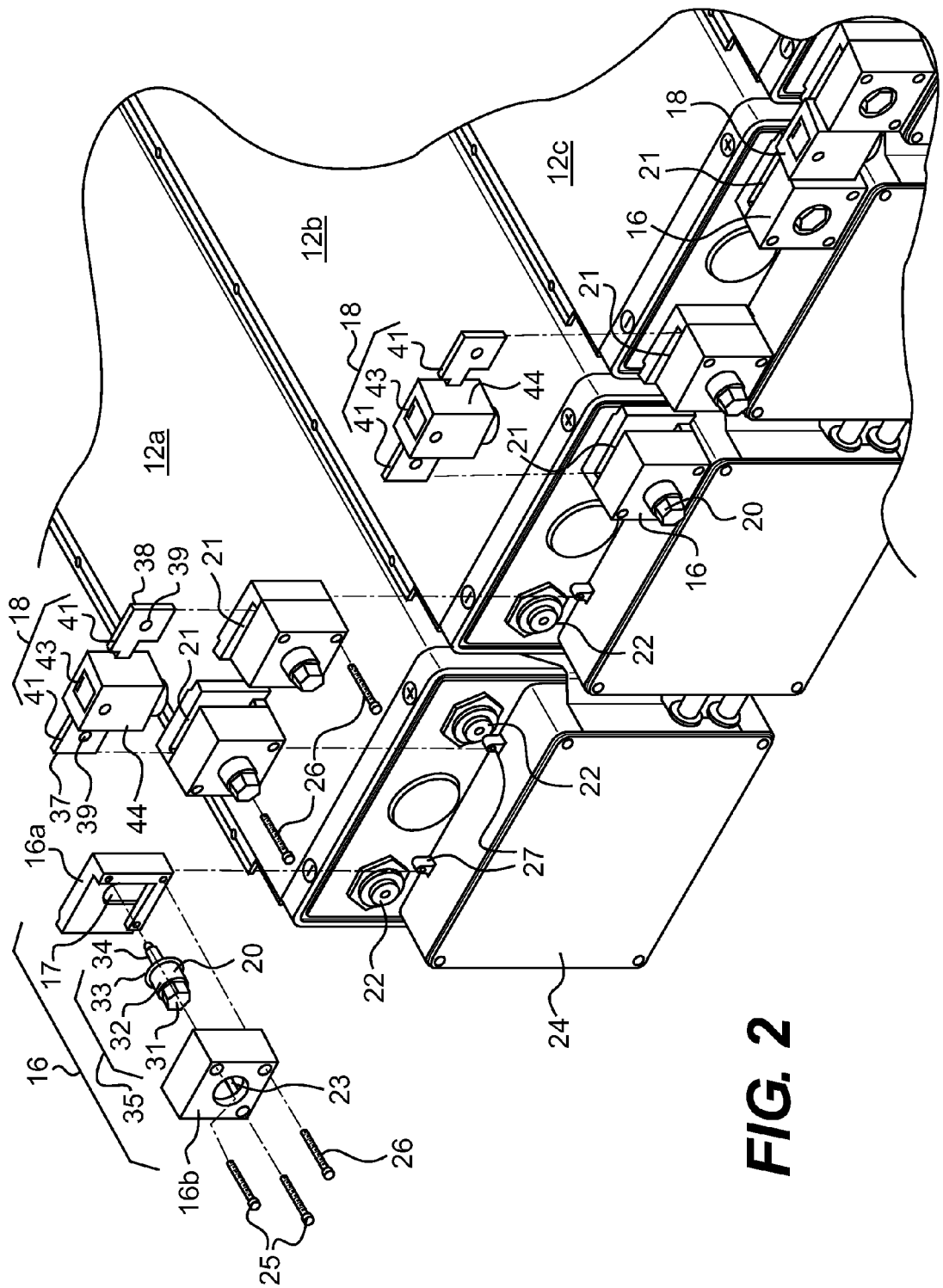
FIG. 2 is a downward front perspective view of the battery pack shown in FIG. 1 with the battery connectors shown in exploded view.

With reference to FIG. 2, there is shown a portion of the automotive battery pack 10 with the battery connectors 14 in various stages of assembly; the battery pole cover 16 of the negative pole 22 of the battery 12a being shown in fully exploded view. The pole cover 16 includes a first portion 16a having an aperture 17 which is adapted to snap onto the protruding portion of the pole 22. The first portion 16a also features an L-shaped ridge 19 defining a receptacle area 21 into which the connect-disconnect safety device 18 is received when the batteries are connected. The pole cover 16 includes a second portion 16b which is fastened to the first portion 16a via screws 25. When assembled, the first and second portion 16a and 16b define the receptacle areas 21 of the battery connector 14. The second portion 16b includes an aperture 23 for receiving the fastener 20. The aperture 23 has a specific diameter corresponding to the diameter of a circular middle portion 32 of the fastener 20. The fastener 20 includes a threaded portion 34 made of metal and an electrically insulating portion 35 made of a non-conductive material. The electrically insulating portion 35 includes a head portion 31, the circular middle portion 32 and a ridge stopper 33. As previously mentioned, the aperture 23 of the second portion 16b has a specific diameter corresponding to the diameter of the middle portion 32 such that when the first and second portion 16a and 16b of the pole cover 16 are assembled, the fastener 20 is trapped inside by the ridge stopper 33. The metallic threaded portion 34 of the fastener 20 is isolated by the electrically insulating portion 35 such that when a technician is tightening the fastener 20 onto the battery pole 22, there is no danger of electric shock. Furthermore, the technician is prevented from touching the metallic threaded portion 34 of the fastener 20 because it is trapped inside the pole cover 16.

The actual connecting component of the battery connectors 14 is the connect-disconnect safety device 18. The connect-disconnect safety device 18 includes a conductive element 41 made of an electrically conductive metal such as copper and an interrupter 43. The central portion of the conductive element 41 passes through the interrupter 43. The interrupter 43 is a pyrotechnic device adapted to cut the central portion of the conductive element 41 in the event of the vehicle being involved in a collision. The interrupter 43 includes a small pyrotechnic charge that, when activated, generates an impulse load on a mechanical cutter that cuts the central portion of the conductive element 41 thereby disconnecting adjacent batteries.

Figure 5:
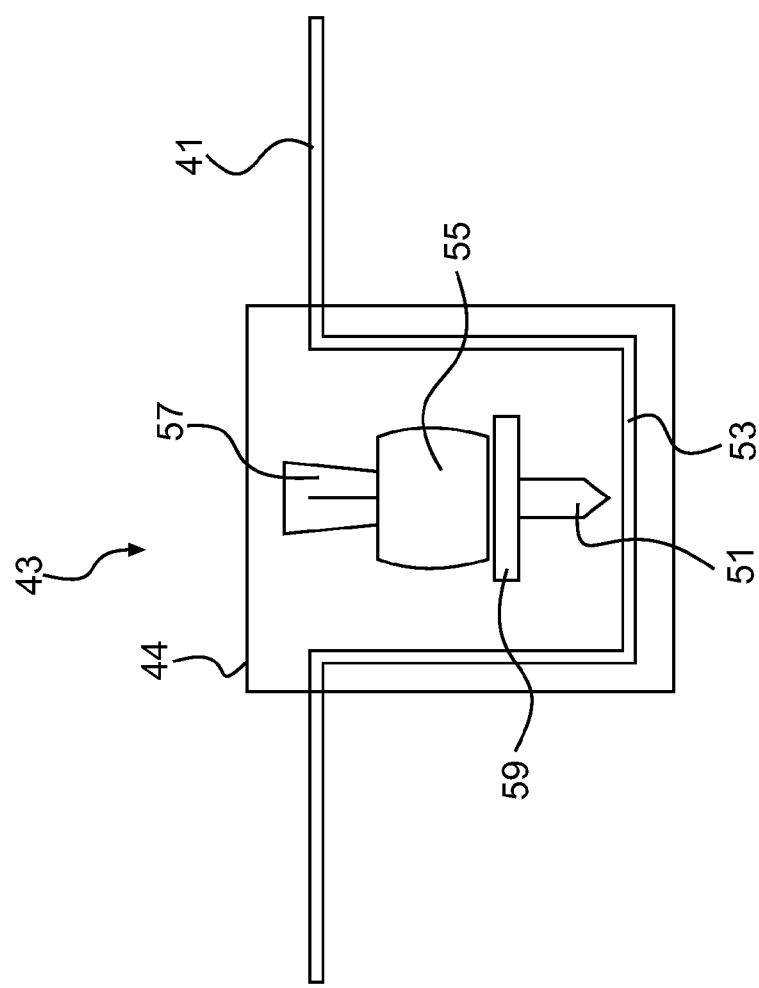
FIG. 5 is a schematic view of the internal components of a connect-disconnect safety device.

In a specific embodiment shown in FIG. 5, the interrupter 43 includes a wedge 51 aligned with the central portion 53 of the conductive component 41 which is actuated by a pyrotechnic charge 55 that cuts the central portion 53 of the conductive element 41 permanently in the event of a collision. An electrical signal received from an electronic control unit (ECU) of the vehicle sensing a collision triggers an igniter 57 that sets off the pyrotechnic charge 55 that generates a impulse on a pressure plate 59 that instantly pushes the wedge 51 against the central portion 53 of the conductive component 41, thereby cutting the conductive element 41 and severing the electrical connection between all the batteries 12a, 12b, 12c, etc. of the high voltage battery pack 10.

Activated during a collision event, the connect-disconnect safety device 18 prevents potential short circuits, providing circuit protection for the batteries 12a, 12b, 12c . . . and preventing short circuits of the entire battery pack 10 with the vehicle frame. It performs this through the utilization of a small pyrotechnic charge that quickly and safely disconnects the batteries 12a, 12b, 12c . . . connected in series thereby isolating each battery from the others and effectively reducing the voltage of the battery pack 10 to a minimum.

As shown in FIG. 2, the conductive element 41 of the connect-disconnect safety device 18 consists of an elongated piece of conductive metal passing through the interrupter 43 wherein the extremities 37 and 38 each include an aperture 39 for receiving the threaded portion 34 of the fasteners 20. The central portion 53 (FIG. 5) of the conductive element 41 is trapped inside the housing 44 of the interrupter 43 which is made of an electrically insulating reinforced plastic material to prevent direct contact between the hand of the technician and the conductive element 41 such that the connection of the batteries 12a, 12b, 12c . . . in series can be made safely. All the components of the interrupter 43 are located in the electrically insulated housing 44. The extremities 37 and 38 of the conductive element 41 are not electrically insulated such that the conductive metal may directly contact the positive or negative poles 22 when the connect-disconnect safety device 18 is installed in the receptacle areas 21 of the pole covers 16 to electrically connect two adjacent batteries 12a, 12b, 12c . . . .

The pole covers 16 are assembled and installed on the battery poles 22 as follows: The first and second portions 16a and 16b are assembled together with the screws 25 with the fastener 20 trapped inside the pole cover 16, the entire assembly is positioned onto the battery pole 22 via the aperture 17 of the first portion 16a. The pole cover 16 is secured to the battery 12 via screw 26 being screwed into a threaded protrusion 27 adjacent to the battery pole 22. Once the pole covers 16 are installed on the battery poles 22, the extremities 37 and 38 of the conductive element 41 of the connect-disconnect safety device 18 are inserted into the receptacle areas 21 of the pole covers 16 of adjacent batteries thereby electrically connecting the positive pole 22 of one battery to the negative pole 22 of the adjacent battery.

Figure 3:
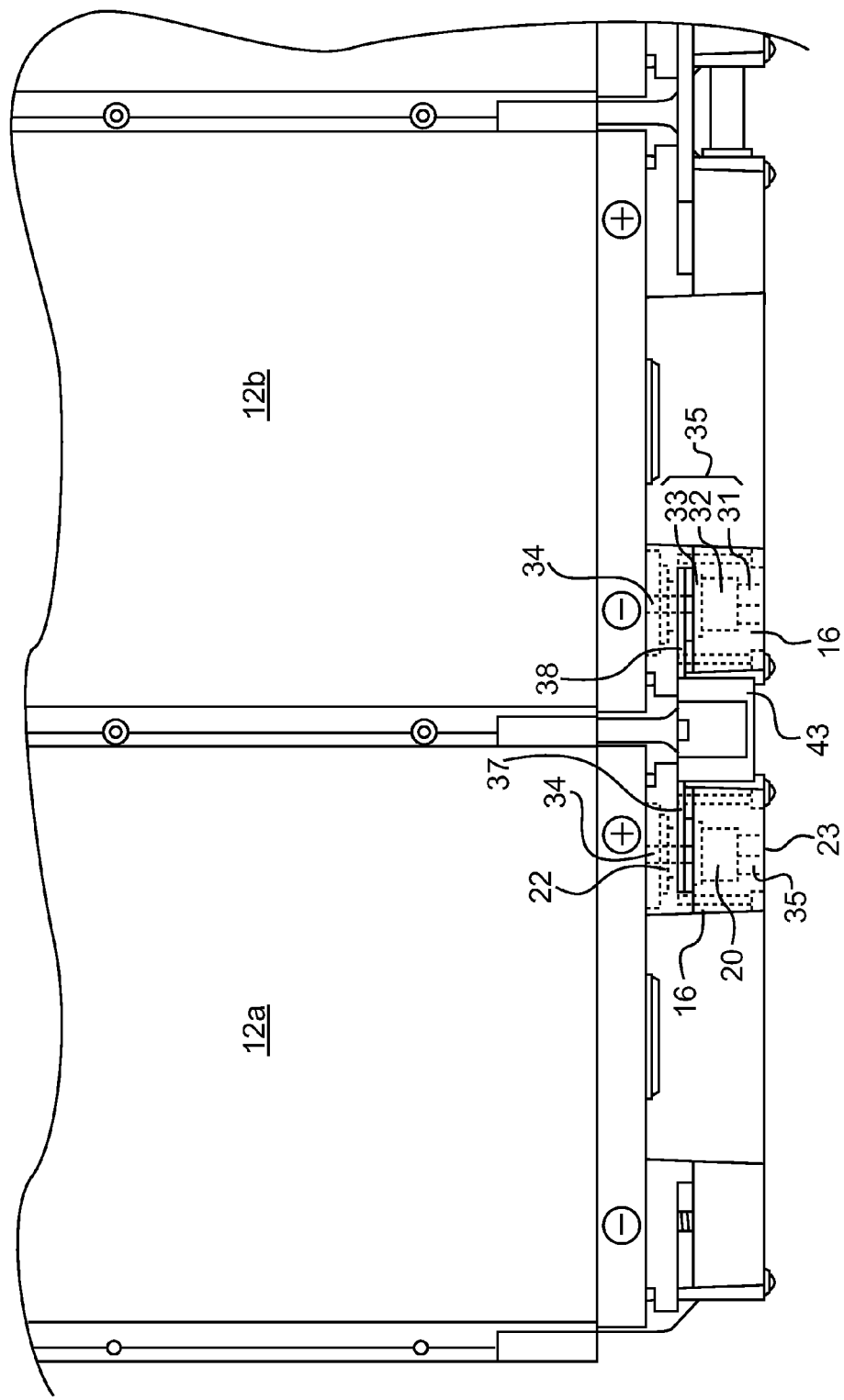
FIG. 3 is a top plan view of the battery pack shown in FIG. 1.
Figure 4:
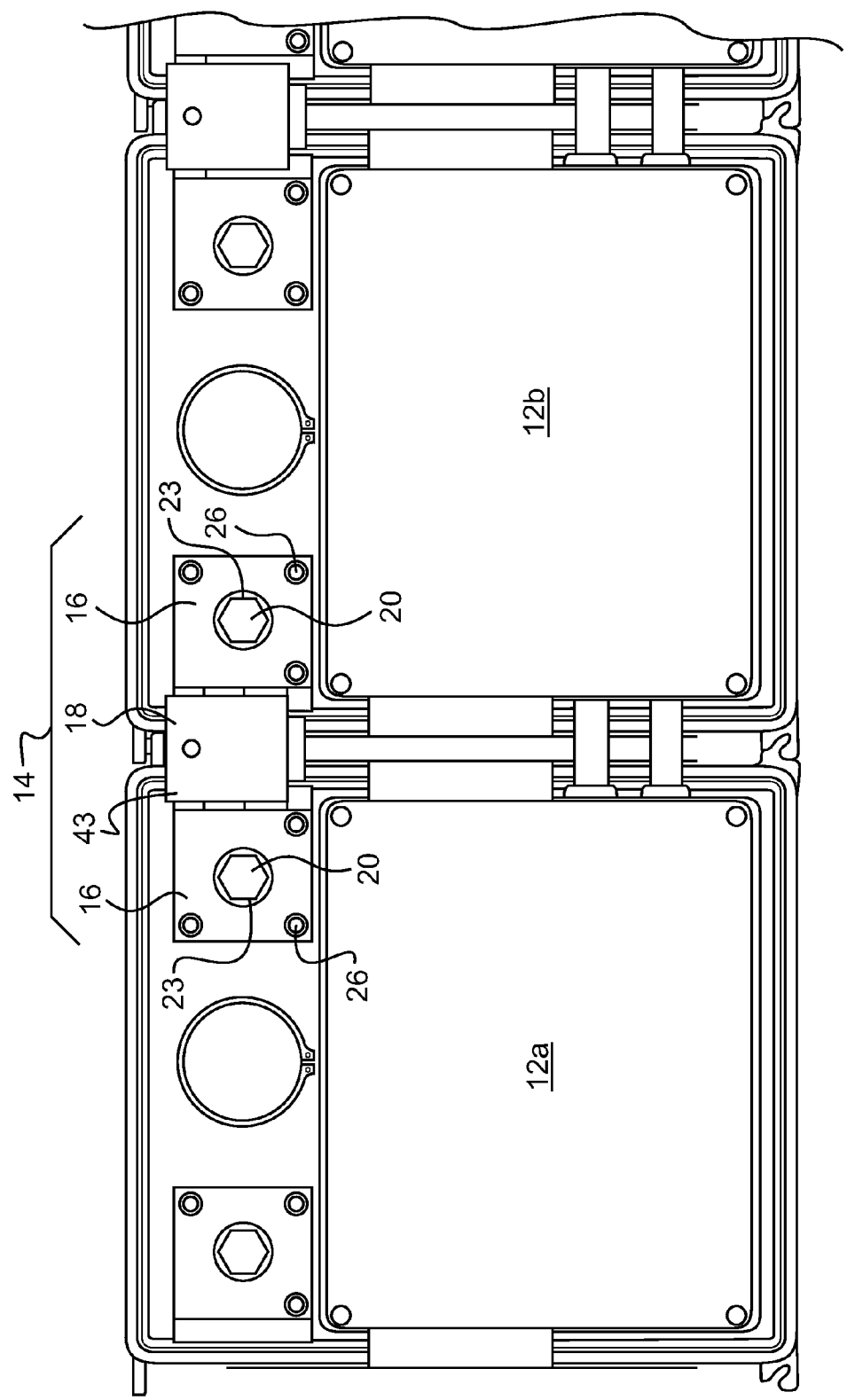
FIG. 4 is a front elevation view of the battery pack shown in FIG. 1.

With reference to FIG. 3, the pole covers 16 are installed onto the poles 22 of the batteries 12a and 12b and the connect-disconnect safety device 18 is inserted into the receptacle areas 21 of the pole covers 16 of the adjacent batteries thereby electrically connecting the batteries 12a and 12b in series. The electrically insulating portions 35 of the fasteners 20 are accessible via the aperture 23 of the pole covers 16. The threaded portion 34 of the fasteners 20 are inserted into the apertures 39 of each extremities 37, 38 of the conductive element 41 and screwed and tightened into the battery poles 22 thereby pressing the extremities 37 and 38 of the conductive element 41 of the connect-disconnect safety device 18 onto the poles 22 and ensuring an effective electrical connection between adjacent batteries. As can be seen in FIGS. 3 and 4, only the interrupter 43 positioned between the adjacent batteries remains exposed once the connect-disconnect safety device 18 is installed into the pole covers 16 thereby preventing any direct contact between the hand of the technician and the conductive metal of the of the conductive element 41.

The electrical connection between two adjacent batteries is therefore electrically isolated from direct contact such that the battery pack 10 is secured from potential electric shock.

During the assembly of a battery pack 10 comprising multiple batteries connected in series, the total voltage of the battery pack 10 increases with each new battery being connected. As the total voltage of the battery pack increases with each new battery being added to the battery pack, the risk of electric shocks for the technician connecting the batteries together as previously described is significantly reduced if not completely eliminated by the use of battery connectors 14 since the battery connectors 14 isolate the technician from the high voltage batteries at each step of the assembly. At no time is the technician exposed to direct contact with an electrically conducting element of the battery pack 10 rendering the battery pack 10 as well as its assembly safe and secure.

In the event of a collision, the connect-disconnect safety device 18 used to connect the batteries 12a, 12b, 12c . . . , the connections between the batteries forming the high voltage battery pack 10 is cut off thereby reducing the voltage of the battery pack to a minimum. The emergency disconnect capabilities of the connect-disconnect safety device 18 effectively reduces the risks of electric shocks emanating from a short circuit between one or more of the batteries 12a, 12b, 12c . . . of the battery pack 10 and the vehicle itself in the event of an accident.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A battery pack for electric or hybrid vehicle having multiple batteries connected in series by battery connectors, each battery having a positive and a negative pole; each battery connector comprising: a pair of battery pole covers made of an electrically insulating material mounted onto battery poles of two adjacent batteries, each battery pole cover having a receptacle area, an aperture providing access to the battery pole and a fastener having a conductive portion trapped inside the receptacle area of the pole cover and an electrically insulating portion extending outside the receptacle area; a connect-disconnect safety device having a conductive element made of an electrically conductive material inserted into the receptacle area of the pole covers for electrically connecting the positive and negative pole of two adjacent batteries via the fastener of each pole cover, and an interrupter, a central portion of the conductive element passing through the interrupter, the interrupter including a pyrotechnic charge and a mechanical cutter adapted to cut the central portion of the conductive element in the event of the vehicle being involved in a collision, thereby disconnecting the series connection of the batteries.

2. A battery pack as defined in claim 1, wherein the interrupter includes a housing made of an electrically insulating reinforced plastic material.

3. A battery pack as defined in claim 1, wherein the mechanical cutter includes a wedge aligned with the central portion of the conductive component which is actuated by the pyrotechnic charge that cuts the central portion of the conductive element permanently in the event of a collision.

4. A battery pack as defined in claim 1, further comprising an igniter that set off the pyrotechnic charge triggered by an electrical signal received from an electronic control unit (ECU) of the vehicle sensing a collision.

5. A battery pack as defined in claim 1, wherein each fastener of the pair of fastener is positioned inside one of the battery pole covers, each fastener including a threaded portion made of metal and an electrically insulated portion made of a non-conductive material.

6. A battery pack as defined in claim 1, wherein each battery pole cover includes a first portion adapted for mounting onto the battery pole and a second portion assembled onto the first portion to define the receptacle area.

7. A battery pack as defined in claim 1, wherein each battery pole cover is made of an electrically insulating plastic.

8. A battery connector for connecting a plurality of batteries in series to form a battery pack, the battery connector comprising: a pair of battery pole covers made of an electrically insulating material for mounting onto battery poles of two adjacent batteries, each battery pole cover having a receptacle area, an aperture for providing access to the battery poles and a fastener having a conductive portion trapped inside the receptacle area of the pole cover and an electrically insulating portion; a connect-disconnect safety device having a conductive element made of an electrically conductive material inserted into the receptacle area of the pole covers for electrically connecting the positive and negative pole of the two adjacent batteries via the fastener of each pole cover, and an interrupter, a central portion of the conductive element passing through the interrupter; the interrupter including a pyrotechnic charge and a mechanical cutter adapted to cut the central portion of the conductive element in the event of the vehicle being involved in a collision, thereby disconnecting the series connection of the batteries.

* * * * *